US012456823B2

(12) United States Patent
Haratani

(10) Patent No.: US 12,456,823 B2
(45) Date of Patent: Oct. 28, 2025

(54) ANTENNA DEVICE

(71) Applicant: Murata Manufacturing Co., Ltd., Nagaokakyo (JP)

(72) Inventor: Kohei Haratani, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 134 days.

(21) Appl. No.: 18/494,855

(22) Filed: Oct. 26, 2023

(65) Prior Publication Data

US 2024/0055774 A1 Feb. 15, 2024

Related U.S. Application Data

(63) Continuation of application No. PCT/JP2022/012229, filed on Mar. 17, 2022.

(30) Foreign Application Priority Data

Apr. 28, 2021 (JP) ................................ 2021-076496

(51) Int. Cl.
*H01Q 21/06* (2006.01)
*H01Q 1/52* (2006.01)
*H01Q 13/08* (2006.01)

(52) U.S. Cl.
CPC ............. *H01Q 21/065* (2013.01); *H01Q 1/52* (2013.01); *H01Q 13/08* (2013.01)

(58) Field of Classification Search
CPC ........ H01Q 21/065; H01Q 1/52; H01Q 13/08; H01Q 1/523; H01Q 9/0407; H01Q 9/0414
See application file for complete search history.

(56) References Cited

U.S. PATENT DOCUMENTS 6,646,609 B2 * 11/2003 Yuasa ...................... H01Q 1/38 343/846
2007/0273607 A1 11/2007 Chen

FOREIGN PATENT DOCUMENTS

| | | | |
|---|---|---|---|
| JP | 2003-051711 | A | 2/2003 |
| JP | 2003-347834 | A | 12/2003 |
| JP | 2008-098919 | A | 4/2008 |
| JP | 6773259 | B1 | 10/2020 |
| WO | 2019/187872 | A1 | 10/2019 |

OTHER PUBLICATIONS

International Search Report and Written Opinion mailed on Jun. 7, 2022, received for PCT Application PCT/JP2022/012229, filed on Mar. 17, 2022, 10 pages including English Translation.

* cited by examiner

*Primary Examiner* — Renan Luque
(74) *Attorney, Agent, or Firm* — XSENSUS LLP

(57) ABSTRACT

An antenna device includes: a main substrate provided with a ground electrode extending in a Y-axis direction; and a sub-substrate mounted on the main substrate. The sub-substrate includes: an upper surface on which a first antenna element and a second antenna element are arranged side by side in the Y-axis direction; and a lower surface on which a mounting terminal portion is disposed. A recessed portion recessed toward the upper surface is formed in a central region (a region between the first antenna element and the second antenna element of the lower surface of the sub-substrate.

20 Claims, 5 Drawing Sheets

ANTENNA DEVICE

CROSS-REFERENCE TO RELATED APPLICATIONS

This is a continuation application of PCT/JP2022/012229, filed on Mar. 17, 2022, designating the United States of America, which is based on and claims priority to Japanese Patent Application No. JP 2021-076496 filed on Apr. 28, 2021. The entire contents of the above-identified applications, including the specifications, drawings and claims, are incorporated herein by reference in their entirety.

TECHNICAL FIELD

The present disclosure relates to an antenna device configured with: a first substrate provided with a ground; and a second substrate provided with a plurality of antenna elements and mounted on the first substrate.

BACKGROUND ART

Japanese Unexamined Patent Application Publication No. 2008-98919 (Patent Document 1) describes an antenna device including a first substrate and a second substrate mounted on the first substrate. The second substrate includes an upper surface on which two adjacent antenna elements are arranged and a lower surface provided with a ground. Moreover, in order to suppress a surface current that is propagated between the two antenna elements, a slit is provided in a region of the second substrate between the antenna elements. By this slit, the second substrate is divided into a substrate on which one antenna element is disposed and a substrate on which the other antenna element is disposed.

CITATION LIST

Patent Document

Patent Document 1: Japanese Unexamined Patent Application Publication No. 2008-98919

SUMMARY OF DISCLOSURE

Technical Problem

In the antenna device described in Japanese Unexamined Patent Application Publication No. 2008-98919 described above, the second substrate is provided with a ground and two antenna elements.

However, among antenna devices, there is an antenna device including: a first substrate provided with a ground; and a second substrate not provided with a ground and provided with only a plurality of antenna elements. In such a configuration, a mounting terminal for mounting the second substrate on the first substrate is provided between the antenna elements of the second substrate and the ground of the first substrate. Therefore, the antenna elements may be coupled to the mounting terminal, instead of the ground, and the antenna characteristics may deteriorate.

In addition, based on two antenna elements being arranged side by side on the second substrate, while a line of electric force formed between an end portion of each antenna element on an outer side in an arrangement direction and the ground passes outside the second substrate (passes through a layer, such as an air layer, having lower permittivity than the second substrate), a line of electric force formed between an end portion of each antenna element on an inner side in the arrangement direction and the ground passes inside the second substrate. Therefore, the symmetry of the permittivity of each antenna element in the arrangement direction (balance of the ratio of the layer outside the second substrate) largely collapses, and the antenna characteristics may deteriorate.

The present disclosure has been made in order to solve the above-described problem, and to improve the characteristics of an antenna device configured with: a first substrate provided with a ground; and a second substrate provided with a plurality of antenna elements and mounted on the first substrate.

Solution to Problem

An antenna device according to the present disclosure includes: a first substrate provided with a ground extending in a first direction; and a second substrate mounted on the first substrate. The second substrate includes a first antenna element, a second antenna element, a first surface, and a second surface opposite to the first surface. The first antenna element and the second antenna element are arranged side by side in the first direction on the first surface or in or on a layer between the first surface and the second surface. A recessed portion recessed toward the first surface is formed in a region of the second surface of the second substrate between the first antenna element and the second antenna element.

According to the present disclosure, a recessed portion recessed toward the first surface is formed in a region of the second surface of the second substrate between the first antenna element and the second antenna element. Therefore, a line of electric force formed between an end portion of each antenna element on an inner side in an arrangement direction and the ground passes through the recessed portion (passes through a layer, such as an air layer, having lower permittivity than the second substrate). As a result, compared with a case in which the recessed portion is not provided, the symmetry of the permittivity of each antenna element in the arrangement direction (balance of the ratio of the layer outside the second substrate) improves. Moreover, isolation between each antenna element and a terminal portion disposed at a position facing the antenna element with the recessed portion interposed therebetween can also be improved. As a result, the characteristics of an antenna device configured with: a first substrate provided with a ground; and a second substrate provided with a plurality of antenna elements and mounted on the first substrate can be improved.

DESCRIPTION OF EMBODIMENTS

Figure 1:
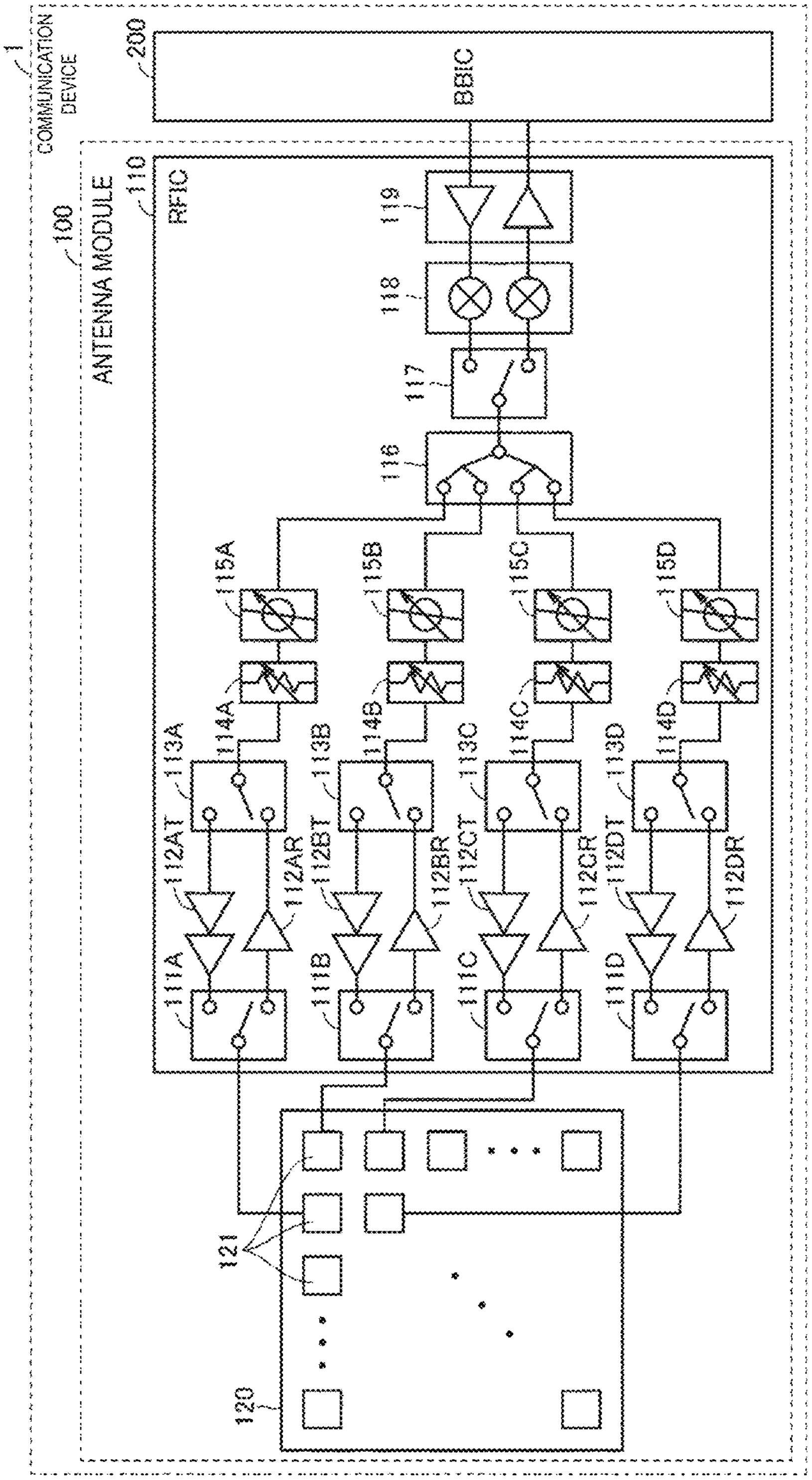
FIG. 1 is an example of a block diagram of a communication device to which an antenna device is applied.

Hereinafter, embodiments of the present disclosure will be described in detail with reference to the drawings. Note that the same or corresponding components in the drawings are denoted by the same reference signs, and description thereof will not be repeated.

(Basic Configuration of Communication Device)

FIG. 1 is an example of a block diagram of a communication device 1 to which an antenna device 120 according to the present embodiment is applied. The communication device 1 is, for example, a portable terminal such as a cellular phone, a smartphone, or a tablet, a personal computer having a communication function, or the like.

With reference to FIG. 1, the communication device 1 includes an antenna module 100 and a baseband IC (BBIC) 200 that constitutes a baseband signal processing circuit. The antenna module 100 includes a radio frequency IC (RFIC) 110 which is an example of a power supply circuit, and the antenna device 120. The communication device 1 up-converts a signal transferred from the BBIC 200 to the antenna module 100 into a radio frequency signal to radiate the radio frequency signal from the antenna device 120, and down-converts a radio frequency signal received by the antenna device 120 to process the down-converted signal in the BBIC 200.

In FIG. 1, for ease of description, only a configuration corresponding to four antenna elements 121 among a plurality of antenna elements 121 constituting the antenna device 120 is illustrated, and a configuration corresponding to other antenna elements 121 having the same configuration is omitted. Note that FIG. 1 illustrates an example in which the antenna device 120 is formed by using the plurality of antenna elements 121 arranged in a two-dimensional array. In the present embodiment, each antenna element 121 is a patch antenna having a substantially square flat-plate shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal multiplexer/demultiplexer 116, a mixer 118, and an amplifier circuit 119.

Based on a radio frequency signal being transmitted, the switches 111A to 111D and 113A to 113D are switched to sides of the power amplifiers 112AT to 112DT, and the switch 117 is connected to a transmission-side amplifier of the amplifier circuit 119. Based on a radio frequency signal being received, the switches 111A to 111D and 113A to 113D are switched to sides of the low-noise amplifiers 112AR to 112DR, and the switch 117 is connected to a reception-side amplifier of the amplifier circuit 119.

A signal transferred from the BBIC 200 is amplified by the amplifier circuit 119, and is up-converted by the mixer 118. A transmission signal, which is the up-converted radio frequency signal, is demultiplexed into four demultiplexed signals by the signal multiplexer/demultiplexer 116, and the four demultiplexed signals pass through four signal paths, and are individually supplied to the different antenna elements 121. At this time, directivity of the antenna device 120 can be adjusted by individually adjusting phase shift degrees of the phase shifters 115A to 115D arranged in the respective signal paths.

Reception signals, which are radio frequency signals received by the respective antenna elements 121, individually pass through the four different signal paths and are multiplexed by the signal multiplexer/demultiplexer 116. The multiplexed reception signal is down-converted by the mixer 118, amplified by the amplifier circuit 119, and transferred to the BBIC 200.

The RFIC 110 is formed as, for example, a one-chip integrated circuit component including the above-described circuit configuration. Alternatively, devices in the RFIC 110 (switches, power amplifiers, low-noise amplifiers, attenuators, and phase shifters) corresponding to the respective antenna elements 121 may be formed as a one-chip integrated circuit component for each of the corresponding antenna elements 121.

(Configuration of Antenna Device)

Figure 2:
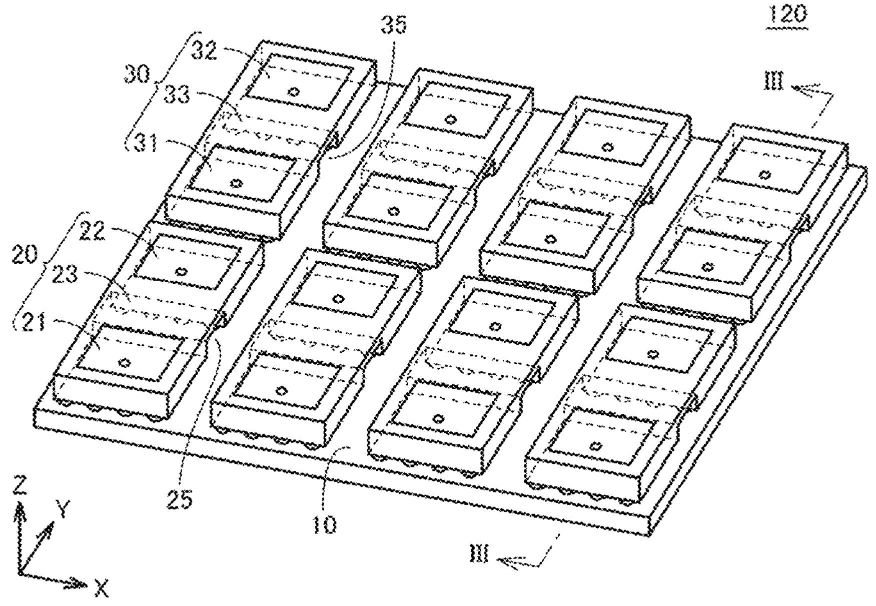
FIG. 2 is a perspective view (Part 1) of the antenna device.

FIG. 2 is a perspective view of the antenna device 120. The antenna device 120 includes a main substrate 10 and array antennas 20 and 30. Note that in the following description, a normal direction of a main surface of the main substrate 10 is referred to as a "Z-axis direction", and directions perpendicular to the Z-axis direction and perpendicular to each other are referred to as an "X-axis direction" and a "Y-axis direction". In addition, in the following description, a positive direction of the Z-axis in each figure may be referred to as an upper surface side, and a negative direction of the Z-axis may be referred to as a lower surface side.

In the example illustrated in FIG. 2, on the upper surface of the main substrate 10, four array antennas 20 are arranged in the X-axis direction at predetermined intervals, and four array antennas 30 are arranged in the X-axis direction at predetermined intervals. The respective four array antennas 30 are arranged at predetermined intervals with respect to the respective four array antennas 20 so as to be adjacent to the respective four array antennas 20 in the Y-axis direction.

Each array antenna 20 includes a first antenna element 21, a second antenna element 22, and a sub-substrate 23. In plan view in the Z-axis direction, the sub-substrate 23 is formed into a substantially rectangular shape whose long sides extend in the Y-axis direction. In plan view in the Z-axis direction, the first antenna element 21 and the second antenna element 22 are each formed into a substantially square shape. The first antenna element 21 and the second antenna element 22 are arranged side by side in the Y-axis direction at a predetermined interval on the upper surface of the sub-substrate 23. Note that the first antenna element 21 and the second antenna element 22 may be arranged side by side in the Y-axis direction at a predetermined interval in or on a layer (a layer between the upper surface and the lower surface of the sub-substrate 23) close to the upper surface of the sub-substrate 23.

Each array antenna 30 includes a first antenna element 31, a second antenna element 32, and a sub-substrate 33. In plan view in the Z-axis direction, the sub-substrate 33 is formed into a substantially rectangular shape whose long sides extend in the Y-axis direction. In plan view in the Z-axis direction, the first antenna element 31 and the second antenna element 32 are each formed into a substantially square shape. The first antenna element 31 and the second antenna element 32 are arranged side by side in the Y-axis direction at a predetermined interval on the upper surface of the sub-substrate 33. Note that the first antenna element 31 and the second antenna element 32 may be arranged side by side in the Y-axis direction at a predetermined interval in or on a layer (a layer between the upper surface and the lower surface of the sub-substrate 33) close to the upper surface of the sub-substrate 33.

The first antenna elements 21 and 31 and the second antenna elements 22 and 32 are each configured to radiate radio waves whose polarization direction is the Y-axis direction. Note that the first antenna elements 21 and 31 and the second antenna elements 22 and 32 are any one of the antenna elements 121 illustrated in FIG. 1.

In this manner, by mounting the four array antennas 20 and the four array antennas 30 on the main substrate 10, the antenna device 120, in which 16 antenna elements in total are arranged in a four-by-four two-dimensional array state, is formed.

Note that a distance between surface centers (intersection point of diagonal lines) of antenna elements is set to be equal to or more than a half (=λ/2) of a wavelength λ of radio waves in a free space.

Figure 3:
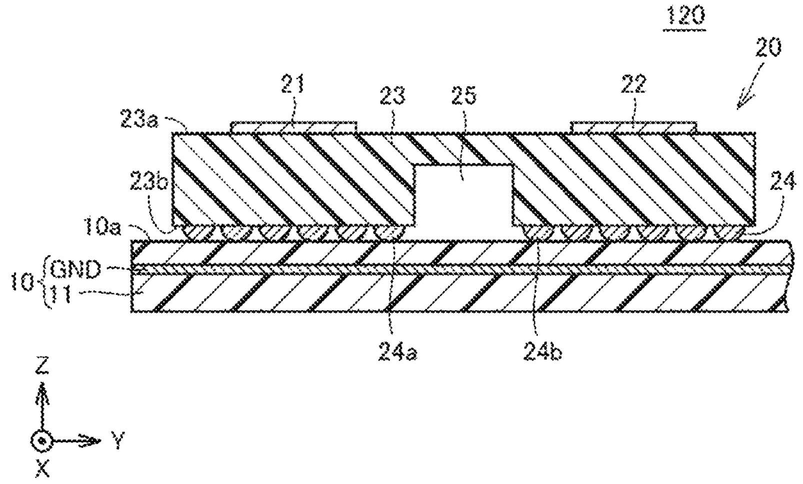
FIG. 3 is a sectional view (Part 1) of the antenna device.

FIG. 3 is a sectional view taken along line III-III of the antenna device 120 in FIG. 2. In FIG. 3, the sectional shape of the array antenna 30 is omitted. Note that the sectional shape of the array antenna 30 is substantially the same as the sectional shape of the array antenna 20.

The main substrate 10 includes a dielectric 11 and a ground electrode GND disposed in or on a layer inside the dielectric 11. The ground electrode GND has a flat-plate shape extending in the Y-axis direction and the X-axis direction.

The sub-substrate 23 of the array antenna 20 includes an upper surface 23*a* and a lower surface 23*b* opposite to the upper surface 23*a*. On the upper surface 23*a* of the sub-substrate 23, the first antenna element 21 and the second antenna element 22 are arranged side by side in the Y-axis direction at a predetermined interval. Note that as described above, the first antenna element 21 and the second antenna element 22 may be arranged side by side in the Y-axis direction at a predetermined interval in or on a layer (a layer between the upper surface 23*a* and the lower surface 23*b* of the sub-substrate 23) close to the upper surface 23*a* of the sub-substrate 23.

On the lower surface 23*b* of the sub-substrate 23, a mounting terminal portion 24 for mounting the sub-substrate 23 on an upper surface 10*a* of the main substrate 10 is disposed. The mounting terminal portion 24 is formed by a conductor such as a plurality of solder bumps, or the like.

A recessed portion 25 recessed toward the upper surface 23*a* is formed in a region (planar region) of the lower surface 23*b* of the sub-substrate 23 between the first antenna element 21 and the second antenna element 22.

The mounting terminal portion 24 includes a first terminal portion 24*a* provided in a first region of the lower surface 23*b* on a side close to the first antenna element 21 (a negative direction side of the Y-axis) with respect to the recessed portion 25, and a second terminal portion 24*b* provided in a second region of the lower surface 23*b* on a side close to the second antenna element 22 (a positive direction side of the Y-axis) with respect to the recessed portion 25.

The recessed portion 25 is formed in a region (a three-dimensional region) of the sub-substrate 23 between the first antenna element 21 and the second terminal portion 24*b* and between the second antenna element 22 and the first terminal portion 24*a*.

In addition, the recessed portion 25 is formed so as to extend in the X-axis direction (that is, a direction orthogonal to the polarization direction of radio waves radiated by each antenna element). Note that also in the array antenna 30, a recessed portion 35 (see FIG. 2) similar to the recessed portion 25 is formed.

FIG. 3 illustrates an example in which the mounting terminal portion 24 includes the first terminal portion 24*a* provided in the first region and the second terminal portion 24*b* provided in the second region, but the disposition of the mounting terminal portion 24 is not limited to such disposition. For example, the mounting terminal portion 24 may include only one of the first terminal portion 24*a* and the second terminal portion 24*b*.

In addition, FIG. 3 illustrates an example in which the first terminal portion 24*a* is disposed on substantially the entire surface of the first region, and the second terminal portion 24*b* is disposed on substantially the entire surface of the second region, but the disposition of the first terminal portion 24*a* and the second terminal portion 24*b* is not limited to such disposition. For example, the first terminal portion 24*a* may be disposed in one portion of the first region, and the second terminal portion 24*b* may be disposed in one portion of the second region. In either case, it is sufficient as long as the recessed portion 25 is formed in at least one of the region between the first antenna element 21 and the second terminal portion 24*b*, and the region between the second antenna element 22 and the first terminal portion 24*a*, at least, of the sub-substrate 23.

Figure 4:
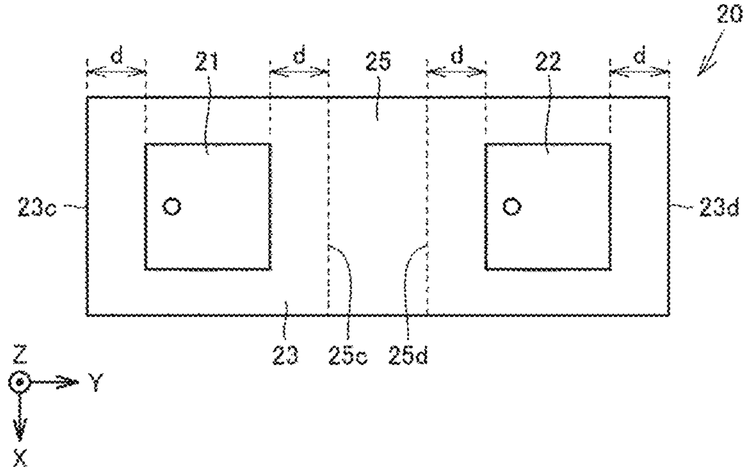
FIG. 4 is a plan view of an array antenna viewed in a Z-axis positive direction.

FIG. 4 is the array antenna 20 in plan view in the Z-axis positive direction. Note that the shape of the array antenna 30 in plan view in the Z-axis positive direction is substantially the same as the shape of the array antenna 20 in plan view in the Z-axis positive direction.

The sub-substrate 23 includes a first end surface 23*c* close to the first antenna element 21 in the Y-axis direction, and a second end surface 23*d* on a side close to the second antenna element 22 in the Y-axis direction. The recessed portion 25 includes a first side surface 25*c* close to the first antenna element 21 in the Y-axis direction, and a second side surface 25*d* close to the second antenna element 22 in the Y-axis direction.

Each of a distance in the Y-axis direction between the first antenna element 21 and the first end surface 23*c*, a distance in the Y-axis direction between the first antenna element 21 and the first side surface 25*c*, a distance in the Y-axis direction between the second antenna element 22 and the second end surface 23*d*, and a distance in the Y-axis direction between the second antenna element 22 and the second side surface 25*d* is a predetermined value d.

As described above, the antenna device 120 according to the present embodiment is configured by mounting the sub-substrate 23 on the main substrate 10 provided with the ground electrode GND. The recessed portion 25 recessed toward the upper surface 23*a* is formed in a central region (a region between the first antenna element 21 and the second antenna element 22) of the lower surface 23*b* of the sub-substrate 23. Therefore, while a line of electric force formed between an end portion of each of the antenna elements 21 and 22 (each of the first antenna element 21 and the second antenna element 22) on an outer side in an arrangement direction and the ground electrode GND passes outside the sub-substrate 23 (passes through an air layer), a line of electric force formed between an end portion of each of the antenna elements 21 and 22 on an inner side in the arrangement direction and the ground electrode GND also passes through the recessed portion 25 (passes through an air layer). Therefore, compared with a case in which the recessed portion 25 is not provided, the symmetry of the permittivity of each of the antenna elements 21 and 22 in the arrangement direction (balance of the ratio of the air layer) improves.

In addition, the recessed portion 25 is formed in a region of the sub-substrate 23 between the first antenna element 21 and the second terminal portion 24*b* and between the second antenna element 22 and the first terminal portion 24*a*. As a result, the coupling strength between the first antenna element 21 and the second terminal portion 24*b* (a terminal portion disposed at a position facing the first antenna element 21 with the recessed portion 25 interposed therebetween) is reduced, and isolation between the first antenna element 21 and the second terminal portion 24*b* can be improved. In addition, the coupling strength between the second antenna element 22 and the first terminal portion 24*a* (a terminal portion disposed at a position facing the second antenna element 22 with the recessed portion 25 interposed therebetween) is reduced, and isolation between the second antenna element 22 and the first terminal portion 24*a* can also be improved.

As a result, the characteristics of the antenna device 120 configured by including: the main substrate 10 provided with the ground electrode GND; and the sub-substrate 23 provided with a plurality of the antenna elements 21 and 22 and mounted on the main substrate 10 can be improved.

In particular, the recessed portion 25 is formed so as to extend in the X-axis direction (that is, a direction orthogonal to the polarization direction of radio waves radiated by each of the antenna elements 21 and 22). As a result, isolation between the first antenna element 21 and the second antenna element 22 can also be improved.

In addition, by forming the recessed portion 25 on the lower surface 23*b* of the sub-substrate 23, the surface area of the upper surface 10*a* of the main substrate 10 that comes in contact with air can be increased, and thus heat dissipation of the main substrate 10 can be improved.

In addition, by forming the recessed portion 25 on the sub-substrate 23, the strength of the portion in which the recessed portion 25 is formed is decreased, and thus stress generated inside the sub-substrate 23 can be concentrated on the portion in which the recessed portion 25 is formed and absorbed. As a result, stress acting on the periphery of the mounting terminal portion 24 is decreased so as to ensure the mounting strength.

Note that the "main substrate 10", the "ground electrode GND", the "first antenna element 21", the "second antenna element 22", and the "sub-substrate 23" of the present embodiment can correspond to a "first substrate", a "ground", a "first antenna element", a "second antenna element", and a "second substrate" of the present disclosure, respectively.

In addition, the "upper surface 23*a*", the "lower surface 23*b*", the "mounting terminal portion 24", and the "recessed portion 25" of the present embodiment can correspond to a "first surface", a "second surface", a "terminal portion", and a "recessed portion" of the present disclosure, respectively.

In addition, the "first terminal portion 24*a*" and the "second terminal portion 24*b*" of the present embodiment can correspond to a "first terminal portion" and a "second terminal portion" of the present disclosure, respectively.

In addition, the "first end surface 23*c*", the "second end surface 23*d*", the "first side surface 25*c*", and the "second side surface 25*d*" of the present embodiment can correspond to a "first end surface", a "second end surface", a "first side surface", and a "second side surface" of the present disclosure, respectively.

[First Modification]

A space formed by the recessed portion 25 and the main substrate 10 that are described above may be used as a space in which a component mounted on the main substrate 10 is disposed.

Figure 5:
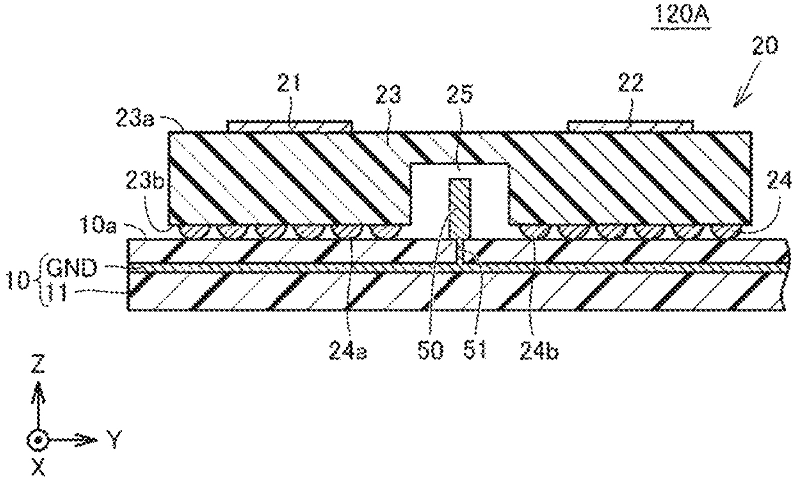
FIG. 5 is a sectional view (Part 2) of an antenna device.

FIG. 5 is a sectional view of an antenna device 120A according to a first modification. In the antenna device 120A, a metal wall 50 that is connected to the ground electrode GND with a conductor 51 interposed therebetween is added in the space formed by the recessed portion 25 and the main substrate 10 in the antenna device 120 according to the above-described embodiment.

With such a modification, the space formed by the recessed portion 25 and the main substrate 10 can be used as a space in which the metal wall 50 mounted on the main substrate 10 is disposed. Moreover, isolation between the first antenna element 21 and the second terminal portion 24*b*, and isolation between the second antenna element 22 and the first terminal portion 24*a* can be further improved.

The "metal wall 50" of the first modification can correspond to a "component" of the present disclosure.

[Second Modification]

A surface of the above-described recessed portion 25 may have an uneven shape so as to increase the surface area of the recessed portion 25.

Figure 6:
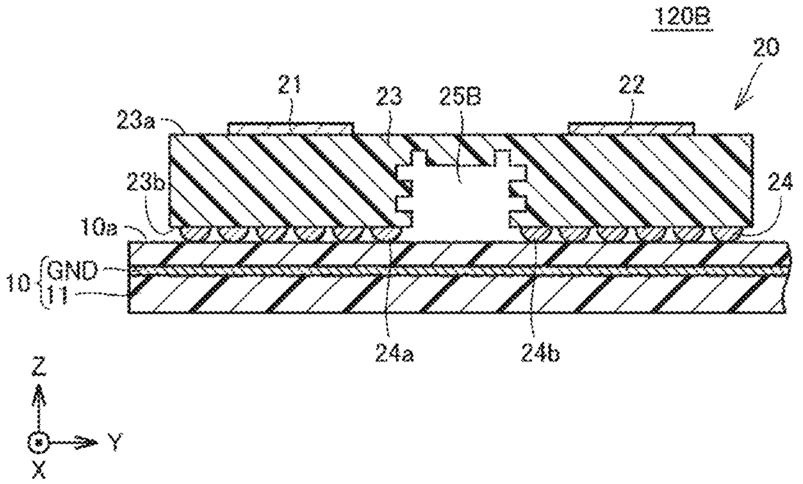
FIG. 6 is a sectional view (Part 3) of an antenna device.

FIG. 6 is a sectional view of an antenna device 120B according to a second modification. In the antenna device 120B, the recessed portion 25 of the antenna device 120 according to the above-described embodiment is changed to a recessed portion 25B. The recessed portion 25B is formed by changing a surface of the recessed portion 25 to an uneven shape.

With such a modification, since the surface area of the recessed portion 25 can be increased, heat dissipation of the main substrate 10 can be further improved.

[Third Modification]

The antenna device 120 according to the above-described embodiment may be changed to a stacked patch antenna.

Figure 7:
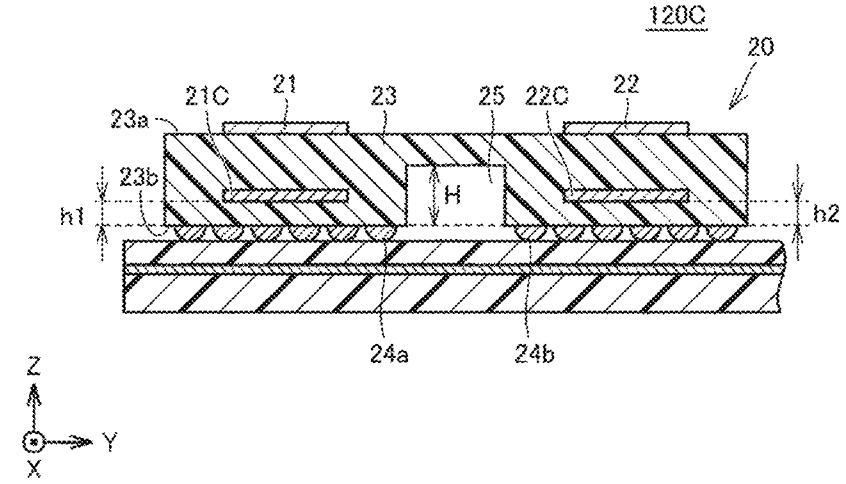
FIG. 7 is a sectional view (Part 4) of an antenna device.

FIG. 7 is a sectional view of an antenna device 120C according to a third modification. In the antenna device 120C, a third antenna element 21C and a fourth antenna element 22C are added to the antenna device 120 according to the above-described embodiment.

The third antenna element 21C is formed in or on a layer between the first antenna element 21 and the lower surface 23*b*. The third antenna element 21C forms a single band type or dual band type stacked antenna together with the first antenna element 21. Note that the single band type may correspond to the first antenna element 21 and the third antenna element 21C radiate radio waves of the same band or the same frequency band. The dual band type may correspond to the first antenna element 21 and the third antenna element 21C radiate radio waves of different bands or different frequency bands.

The fourth antenna element 22C is formed in or on a layer between the second antenna element 22 and the lower surface 23*b*. The fourth antenna element 22C forms a single band type or dual band type stacked antenna together with the second antenna element 22. Note that the single band type may correspond to the second antenna element 22 and the fourth antenna element 22C radiate radio waves of the same band or the same frequency band. The dual band type may correspond to the second antenna element 22 and the fourth antenna element 22C radiate radio waves of different bands or different frequency bands.

In the antenna device 120C described above, the recessed portion 25 is disposed in a region between the third antenna element 21C and the fourth antenna element 22C. More specifically, a depth H of the recessed portion 25 is formed so as to be larger than a distance h1 between the lower surface 23*b* and the third antenna element 21C, and a distance h2 between the lower surface 23*b* and the fourth antenna element 22C. As a result, isolation between the third antenna element 21C and the fourth antenna element 22C can also be improved.

The "third antenna element 21C" and the "fourth antenna element 22C" of the third modification can correspond to a "third antenna element" and a "fourth antenna element" of the present disclosure, respectively.

[Fourth Modification]

In the antenna device 120 according to the above-described embodiment, a width in the Y-axis direction of each of the recessed portion 25 and the recessed portion 35 may be made larger than a distance in the Y-axis direction between the sub-substrate 23 and the sub-substrate 33.

Figure 8:
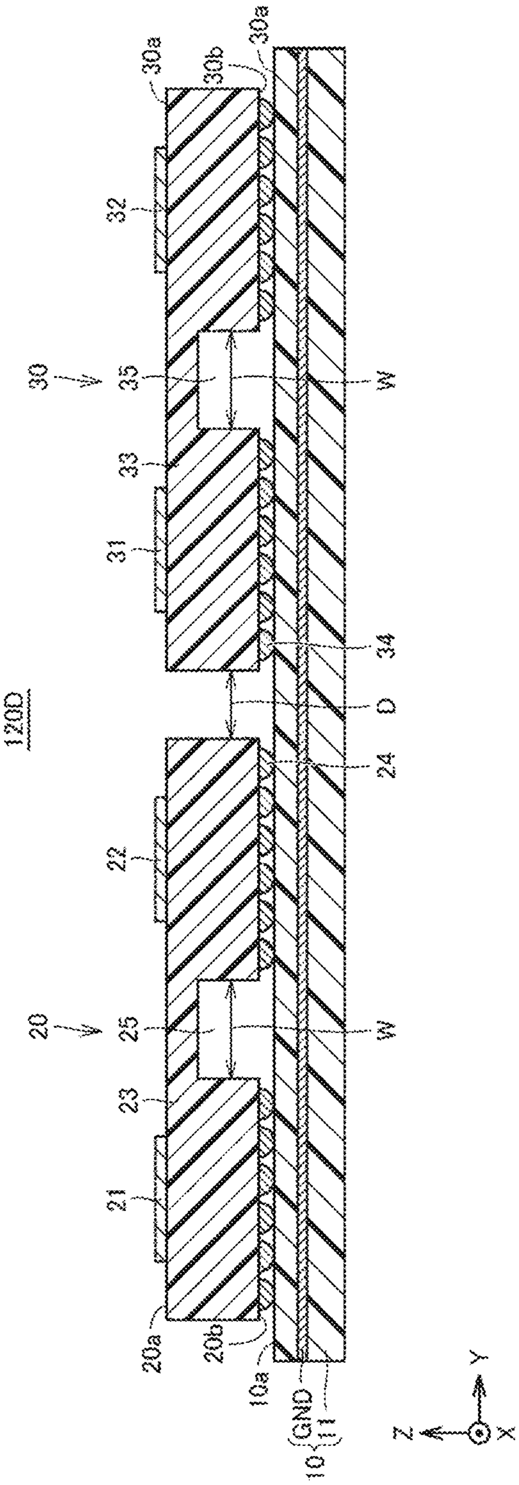
FIG. 8 is a sectional view (Part 5) of an antenna device.

FIG. 8 is a sectional view of an antenna device 120D according to a fourth modification. In the antenna device 120D, a width W in the Y-axis direction of each of the recessed portion 25 and the recessed portion 35 is made larger than a distance D in the Y-axis direction between the sub-substrate 23 and the sub-substrate 33 in the antenna device 120 according to the above-described embodiment.

By doing so, the volume of the air layer formed by the recessed portion 25 can be made closer to the volume of the air layer formed between the sub-substrate 23 and the sub-substrate 33 adjacent to each other. Therefore, the symmetry of the permittivity of the second antenna element 22 in the Y-axis direction can be improved. Similarly, the symmetry of the permittivity of the first antenna element 31 in the Y-axis direction can be improved.

The "sub-substrate 33" of the fourth modification can correspond to a "third substrate" of the present disclosure.

[Fifth Modification]

In the above-described embodiment, an example in which an air layer is formed in a region between the recessed portion 25 and the main substrate 10 has been described, but at least part of the region between the recessed portion 25 and the main substrate 10 may be filled with a resin having smaller permittivity than the sub-substrate 23.

It should be understood that the embodiments disclosed herein are exemplary in all aspects and are non-restrictive. The scope of the present disclosure is represented by the claims not by the description of the above embodiments, and intends to include all modifications within the meaning and scope equivalent to the claims.

REFERENCE SIGNS LIST

1 communication device, 10 main substrate, 10*a*, 23*a* upper surface, 11 dielectric, 20, 30 array antenna, 21 first antenna element, 21C third antenna element, 22 second antenna element, 22C fourth antenna element, 23, 33 sub-substrate, 23*b* lower surface, 23*c* first end surface, 23*d* second end surface, 24 mounting terminal portion, 24*a* first terminal portion, 24*b* second terminal portion, 25, 25B, 35 recessed portion, 25*c* first side surface, 25*d* second side surface, 50 metal wall, 51 conductor, 100 antenna module, 111A, 111D, 113A, 113D, 117 switch, 112AR, 112DR low-noise amplifier, 112AT, 112DT power amplifier, 114A, 114D attenuator, 115A, 115D phase shifter, 116 demultiplexer, 118 mixer, 119 amplifier circuit, 120, 120A to 120D antenna device, 121 antenna element

The invention claimed is:

1. An antenna device comprising:
- a first substrate provided with a ground extending in a first direction; and
- a second substrate mounted on the first substrate, wherein
- the second substrate includes
  - a first antenna element,
  - a second antenna element,
  - a first surface, and
  - a second surface opposite to the first surface,
- the first antenna element and the second antenna element are arranged side by side in the first direction on the first surface or in or on a layer between the first surface and the second surface, and
- a recessed portion recessed toward the first surface is formed in a region of the second surface of the second substrate between the first antenna element and the second antenna element, wherein
- the second surface is provided with a terminal portion for mounting the second substrate on the first substrate,
- the recessed portion is formed in a region of the second substrate between at least one of the first antenna element and the second antenna element, and the terminal portion,
- the terminal portion includes
  - a first terminal portion that is provided in a region of the second surface on a side close to the first antenna element with respect to the recessed portion, and
  - a second terminal portion that is provided in a region of the second surface on a side close to the second antenna element with respect to the recessed portion, and
- the recessed portion is formed in a region of the second substrate between the first antenna element and the second terminal portion, and between the second antenna element and the first terminal portion.

2. The antenna device according to claim 1, wherein
- the second substrate includes a first end surface close to the first antenna element in the first direction, and a second end surface close to the second antenna element in the first direction,
- the recessed portion includes a first side surface close to the first antenna element in the first direction, and a second side surface close to the second antenna element in the first direction,
- a distance in the first direction between the first antenna element and the first end surface of the second substrate is substantially equal to a distance in the first direction between the first antenna element and the first side surface of the recessed portion, and
- a distance in the first direction between the second antenna element and the second end surface of the second substrate is substantially equal to a distance in the first direction between the second antenna element and the second side surface of the recessed portion.

3. The antenna device according to claim 2, further comprising a component that is disposed in a space formed by the recessed portion of the second substrate and the first substrate.

4. The antenna device according to claim 3, wherein
- a surface of the recessed portion has an uneven shape.

5. The antenna device according to claim 4, wherein
- the second substrate further includes
  - a third antenna element formed in a region between the first antenna element and the second surface, and
  - a fourth antenna element formed in a region between the second antenna element and the second surface, and
- the recessed portion is disposed in a region between the third antenna element and the fourth antenna element.

6. The antenna device according to claim 5, wherein
- a depth of the recessed portion is larger than a distance between the second surface and the third antenna element, and a distance between the second surface and the fourth antenna element.

7. The antenna device according to claim 1, further comprising a component that is disposed in a space formed by the recessed portion of the second substrate and the first substrate.

8. The antenna device according to claim 1, wherein a surface of the recessed portion has an uneven shape.

9. The antenna device according to claim 1, wherein the second substrate further includes
a third antenna element formed in a region between the first antenna element and the second surface, and
a fourth antenna element formed in a region between the second antenna element and the second surface, and
the recessed portion is disposed in a region between the third antenna element and the fourth antenna element.

10. The antenna device according to claim 9, wherein a depth of the recessed portion is larger than a distance between the second surface and the third antenna element, and a distance between the second surface and the fourth antenna element.

11. The antenna device according to claim 1, wherein the first antenna element and the second antenna element radiate radio waves having a polarization direction, and the recessed portion extends in a direction intersecting the polarization direction.

12. The antenna device according to claim 2, wherein a surface of the recessed portion has an uneven shape.

13. The antenna device according to claim 2, wherein the second substrate further includes
a third antenna element formed in a region between the first antenna element and the second surface, and
a fourth antenna element formed in a region between the second antenna element and the second surface, and
the recessed portion is disposed in a region between the third antenna element and the fourth antenna element.

14. The antenna device according to claim 3, wherein the second substrate further includes
a third antenna element formed in a region between the first antenna element and the second surface, and
a fourth antenna element formed in a region between the second antenna element and the second surface, and
the recessed portion is disposed in a region between the third antenna element and the fourth antenna element.

15. An antenna device comprising:
a first substrate provided with a ground extending in a first direction; and
a second substrate mounted on the first substrate, wherein the second substrate includes
a first antenna element,
a second antenna element,
a first surface, and
a second surface opposite to the first surface,
the first antenna element and the second antenna element are arranged side by side in the first direction on the first surface or in or on a layer between the first surface and the second surface, and
a recessed portion recessed toward the first surface is formed in a region of the second surface of the second substrate between the first antenna element and the second antenna element, wherein
the second surface is provided with a terminal portion for mounting the second substrate on the first substrate, and
the recessed portion is formed in a region of the second substrate between at least one of the first antenna element and the second antenna element, and the terminal portion,
wherein the antenna device further comprises a third substrate that is arranged next to the second substrate in the first direction on the first substrate, wherein
a width in the first direction of the recessed portion is larger than a distance in the first direction between the second substrate and the third substrate.

16. The antenna device according to claim 15, wherein the first antenna element and the second antenna element radiate radio waves having a polarization direction, and the recessed portion extends in a direction intersecting the polarization direction.

17. The antenna device according to claim 15, wherein
the second substrate includes a first end surface close to the first antenna element in the first direction, and a second end surface close to the second antenna element in the first direction,
the recessed portion includes a first side surface close to the first antenna element in the first direction, and a second side surface close to the second antenna element in the first direction,
a distance in the first direction between the first antenna element and the first end surface of the second substrate is substantially equal to a distance in the first direction between the first antenna element and the first side surface of the recessed portion, and
a distance in the first direction between the second antenna element and the second end surface of the second substrate is substantially equal to a distance in the first direction between the second antenna element and the second side surface of the recessed portion.

18. The antenna device according to claim 15, further comprising a component that is disposed in a space formed by the recessed portion of the second substrate and the first substrate.

19. The antenna device according to claim 15, wherein a surface of the recessed portion has an uneven shape.

20. The antenna device according to claim 15, wherein the second substrate further includes
a third antenna element formed in a region between the first antenna element and the second surface, and
a fourth antenna element formed in a region between the second antenna element and the second surface, and
the recessed portion is disposed in a region between the third antenna element and the fourth antenna element.

* * * * *